United States Patent [19]
Pflaumer et al.

[11] Patent Number: 4,781,938
[45] Date of Patent: Nov. 1, 1988

[54] SHELF-STABLE SNACK PRODUCT

[75] Inventors: Phillip F. Pflaumer, Hamilton; James P. Smith, Cincinnati, both of Ohio

[73] Assignee: The Procter & Gamble Company, Cincinnati, Ohio

[21] Appl. No.: 94,952

[22] Filed: Sep. 9, 1987

Related U.S. Application Data

[63] Continuation-in-part of Ser. No. 945,744, Dec. 23, 1986, abandoned.

[51] Int. Cl.$^4$ .................... A21D 10/00; A21D 10/04
[52] U.S. Cl. .................................... 426/549; 426/551; 426/552; 426/553; 426/554; 426/555; 426/658
[58] Field of Search ............... 426/549, 550, 558, 658, 426/555, 554, 553, 552, 551

[56] References Cited

U.S. PATENT DOCUMENTS

| | | | |
|---|---|---|---|
| 3,728,132 | 4/1973 | Tsuyama et al. | 99/141 R |
| 3,733,208 | 5/1973 | Sato et al. | 99/90 R |
| 4,233,321 | 11/1980 | Zenner et al. | 426/19 |
| 4,233,330 | 11/1980 | Zenner et al. | 426/321 |
| 4,291,065 | 9/1981 | Zobel et al. | 426/549 |
| 4,320,151 | 3/1982 | Cole | 426/18 |
| 4,344,969 | 8/1982 | Youngquist et al. | 426/18 |
| 4,416,903 | 11/1983 | Cole | 426/18 |
| 4,444,799 | 4/1984 | Vanderveer et al. | 426/549 |
| 4,455,333 | 6/1984 | Hong et al. | 426/94 |
| 4,456,625 | 6/1984 | Durst | 426/106 |
| 4,503,080 | 3/1985 | Brabbs et al. | 426/94 |
| 4,511,318 | 4/1985 | Kolodesh et al. | 425/133.1 |
| 4,511,585 | 4/1985 | Durst | 426/106 |
| 4,584,203 | 4/1986 | DuVall et al. | 426/549 |
| 4,664,921 | 5/1987 | Seiden | 426/94 |

FOREIGN PATENT DOCUMENTS

| | | |
|---|---|---|
| 745082 | 7/1970 | Belgium . |
| 155203 | 9/1985 | European Pat. Off. . |
| 58-162232 | 9/1983 | Japan . |
| 60-203134 | 10/1985 | Japan . |

OTHER PUBLICATIONS

McCullough et al., "High Fructose Corn Syrup Replacement for Sucrose in Shortened Cakes", *Journal of Food Science,* 51(2), 536-537 (1986).
Ludewig et al., "Effect of Different Sugar Types on the Production of Fine Bakery Products", *Getriede, Mehl and Brot.,* 34(8), 206-215 (1980) (abstract only appearing in FSTA, vol. 15, No. 12 (1983)).

*Primary Examiner*—R. B. Penland
*Attorney, Agent, or Firm*—Gretchen R. Babcock; David K. Dabbiere; Steven J. Goldstein

[57] ABSTRACT

Disclosed are ready-to-eat, crumb structured, baked snack food products that are shelf-stable and additionally provide the benefits of desirable moistness, chewiness, fast mouth dispersion upon eating, and reduced tackiness and gumminess. These products are characterized by a unique saccharide mixture which comprises mono-, di- and trisaccharides, a low level of tetra- and higher saccharides, and sucrose; a low moisture content characterized by a water activity from about 0.40 to about 0.75; and a starch component such that the saccharide to starch ratio of the product is from about 1:1 to about 4.5:1. Also disclosed are wet and dry prepared culinary mixes containing the same unique saccharide mixture from which these same baked snack products can be prepared.

28 Claims, No Drawings

SHELF-STABLE SNACK PRODUCT

This application is a continuation-in-part of U.S. patent application Ser. No. 945,744, Pflaumer and Smith, filed Dec. 23, 1986 abandoned.

TECHNICAL FIELD

This invention relates to unique ready-to-eat, crumb-structured snack food products.

BACKGROUND OF THE INVENTION

Freshly made baked products are the standard of excellence for crumb-structured, sweetened, snack products whether they are home-baked or purchased from a bakery. Important features of these baked products are their fresh flavor and moist, chewy texture. Particularly desirable are hand-held cake-like snack products such as cupcakes, muffins, quick breads, cookies and brownies. These items are often consumed on-the-run for breakfast or packed into lunch boxes to be consumed at work or school.

Though these products are very tasty and appetizing when fresh, they typically lose their fresh-baked characteristics within a few days, necessitating either repeated baking in the home or frequent trips to the bakery to permit their enjoyment over longer periods of time. Thus, a great demand exists today for baked, ready-to-eat, packaged snack products that are of the same quality as freshly-baked snack foods, but which can be stored for long periods of time prior to consumption without significant loss of any fresh-baked characteristics.

Providing commercial shelf-stable, ready-to-eat snacks which retain their fresh baked characteristics such as moistness, tenderness, and good flavor is a very difficult task. Baked products have a shelf-life of, at most, one week. Packaging can extend the shelf-life somewhat (up to perhaps two weeks) but is not a total solution since most changes in the product which result in staling are independent of ambient conditions. Commercial pre-baked, packaged snack products are often shipped over long distances and generally must be stored for extended periods of time prior to ultimate purchase by the consumer. Thus, if these products are to compete with freshly-baked snacks they must be able to retain their fresh-baked characteristics for several months and, desirably, for up to one year or more. Such products would be especially well-suited for sale in vending machines or for sale to consumers who plan to store the products for extended periods of time in the home.

Conventional crumb-structured baked goods are made from shortening, flour, water, sugar (sucrose) and usually eggs. Each of these ingredients plays an important role in producing baked goods with their well-known flavor and texture characteristics. The ingredients must be combined in particular proportions in order to get the desired results. Minor amounts of other ingredients, such as flour enrichers, leavening, salt and various flavorings, may be added depending on the final form of snack product desired. Such baking techniques and ingredient choices are well known by one skilled in the art of baking.

There are two problems with these conventional recipes. First, these conventional baked goods customarily contain a high level of water. Though this produces a moist, tender product it also provides a growth media for bacteria and mold. The second concern with traditional baked good relates to the high level of moisture in the batter. Upon heating, individual starch granules absorb moisture causing them to swell and gelatinize. Upon cooling and standing, the gelatinized starch tends to recrystalize in a way that makes the product rigid and makes the crumb structure appear dry. This eventually gives the product a dried-out appearance. This process is commonly known as staling. Another type of staling, sugar crystallization, occurs in products containing essentially sucrose as the only saccharide. At the water activity values characteristic of the products of the present invention, the sucrose, which is amorphorus after baking, will slowly crystallize, producing a firm but brittle and crumbly texture.

A number of methods have been disclosed in the art which attempt to extend shelf stability. However, these methods result in significant compromises in the quality of baked goods. For example, U.S. Pat. No. 4,511,585, Durst, issued Apr. 16, 1985, discloses ready-to-eat baked goods which are shelf-stable for up to one year. These products are prepared with the addition of at least 5% by weight of the product of an edible, liquid polyhydric alcohol. This is said to minimize the gelatinization and subsequent recrystallization of starch so that the baked snack product does not "stale" in the short period of time that regular bakery products do. However, these polyhydric alcohol compounds, like glycerine and propylene glycol are objectionable to consumers who are seeking wholesome food. U.S. Pat. No. 4,416,903, Cole, issued Nov. 22, 1983, alternatively discloses anti-staling bakery compositions wherein enzymes are incorporated into the product to retard staling.

Changing the sugar component of baked goods from the commonly used sucrose to other sugars or combinations of sugars to preserve the fresh flavor and texture of the goods is also known. See, for example, "High Fructose Corn Syrup Replacement for Sucrose in Shortened Cakes", *Journal of Food Science*, Vol. 51, No. 2, (1986), pp. 536–37, which discloses the replacement of sucrose with high fructose corn syrup to achieve moister cakes. However, this results in a product with a very high degree of starch gelatinization which could, in time, lead to starch staling. U.S. Pat. No. 4,233,330, Zenner, issued Nov. 11, 1980, discloses replacing 10–35% of the sugar and fat content of cake products with lactose to prolong the shelf life of the product. However, lactose is not well tolerated by many adults, and is therefore not desirable in products of this type. U.S. Pat. No. 4,291,065, Zobel, issued Sept. 22, 1981, discloses a method for controlling the starch staling of sweet baked goods by replacing 30–100% of the sweetener composition with oligosaccharides having two or three saccharide units. However, no attention is given to the need to carefully balance the mono-, di-, tri-, and higher saccharide content in order to imitate the texture and sweetness of conventional fresh baked sucrose-based products. Clearly, none of this art permits the formulation of baked products which are as moist and good tasting as freshly baked conventional products, and which retain their freshness at all stages of shelf life for up to one year or more.

It is therefore an objective of the present invention to provide baked, read-to-eat high quality good tasting snack products which are storage stable for up to one year or more.

It is a further objective of the present invention to provide baked, ready-to-eat snack products which have a moist, chewy texture, reduced tackiness and gumminess, and which provide fast mouth dispersion upon eating.

It is a further objective of the present invention to provide baked, ready-to-eat snack products which have a low water activity, making them resistant to microbiological spoilage without the need for special packaging.

It is also an objective of the present invention to provide baked, ready-to-eat snack products which, through the utilization of a unique sweetener component comprising a specific mixture of mono-, intermediate-, and higher-saccharides, achieves moistness and good taste even after extended product storage.

SUMMARY OF THE INVENTION

The present invention relates to a crum-structured, ready-to-eat baked snack product with a water activity of from about 0.40 to about 0.75, said snack product having extended storage stability and resistance to staling and which comprises:
  (a) from about 20 to about 60% of a unique saccharide mixture, which comprises, by weight of said saccharide mixture:
    (1) from about 25 to about 45% monosaccharides, selected from the group consisting of glucose, fructose, and mixtures thereof;
    (2) from about 10 to about 50% glucose-based di- and trisaccharides selected from the group consisting of maltose, isomaltose, maltotriose and other isomers of glucose-based trisaccharides and mixtures thereof;
    (3) from about 4 to about 9% glucose-based tetra- and higher saccharides; and
    (4) from about 15 to about 60% sucrose; and
  (b) from about 15 to about 35% of a starch component.

Preferably, the saccharide and starch are added in amounts such that the saccharide to starch ratio is from about 1:1 to about 4.5:1 in said baked product.

The present invention also relates to wet and dry prepared culinary mixes with the same unique saccharide mixture from which the baked snack products of the present invention can be prepared.

DETAILED DESCRIPTION OF THE INVENTION

The present invention relates to novel, sweetened, crumb-structured, baked goods which have extended storage stability and which retain the desirable fresh, good-tasting qualities of freshly baked good over a long shelf life. By "crumb-structured" products is meant baked sweetened products with a texture such as is typical of cookies, cakes, brownies and muffins.

The baked goods of the present invention comprise from about 20 to about 60% of a saccharide mixture, from about 15 to about 35% of a starch component, and water so that the water activity of the baked good is between 0.40 and 0.75. The baked goods described herein can also contain the following conventional components: from about 10 to about 25% shortening, and from 0 to about 15% combined egg solids, salt and miscellaneous additives.

The baked goods of the present invention can be differentiated from conventional fresh baked goods by their lower water activity and by their unique saccharide mixture.

Unless otherwise stated, all percentages, ratios or proportions expressed herein are by weight.

Saccharide Component

Traditionally, sucrose is the only sweetening component used in baked goods. The present invention replaces the usual sucrose component with a unique saccharide mixture. This unique saccharide mixture typically comprises from about 20 to about 60%, preferably from about 35 to about 45% of the baked good. At levels above this, the resulting product approaches a taffy or caramel candy rather than a crumb-structured cake-like or cookie product. At levels much below this range, for example, in a bread-like product, the sugars would not be present in a significant enough amount to provide the desired moist, chewy texture at the lower water activity values. More specifically, this saccharide mixture is comprised, by weight of said saccharide mixture, of from about 25 to about 45% monosaccharides selected from the group consisting of glucose, fructose, and mixtures thereof; from about 10 to about 50% glucose-based di- and tri-saccharides selected from the group consisting of maltose, isomaltose, maltotriose and other isomers of glucose-based trisaccharides and mixtures thereof; from about 4 to about 9% glucose-based tetra- and higher saccharides; and from about 15 to about 60% sucrose.

In a conventional baked good system where sucrose is the predominant sugar, and the moisture content is high, starch gelatinizes at temperatures reached during the baking process. As the product ages after baking, the starch recrystallizes in a way which makes the product stale in a short period of time. The unique saccharide mixture used in the present invention, in combination with controlled levels of water, is believed to alter the gelatinization and recrystallization characteristics of the starch in such a way as to inhibit staling of the product. The products made with this system enjoy significantly increased shelf-stability without noticeable staling. If the snack products of the present invention are made with only sucrose but with a low water content, starch gelatinization is also inhibited. However, such products are undesirable because they are characterized by a dry eating quality and the sucrose tends to crystallize. Desirable sweetened baked goods are moist and chewy without being gummy, sticky or tacky. It is this unique saccharide mixture that provides both these desirable textural characteristics, and the storage stability to the products of this invention.

The simplest saccharides in the saccharide mixture are monosaccharides. Examples of monosaccharides are glucose and fructose. These monosaccharides are present in the sugar component of the present invention at a total level of from about 25 to about 45%, preferably about 30 to about 35%. At the lower water activity values of the present invention, these monosaccharides are needed to provide a moist eating quality to the baked products and fast mouth dispersion. Without wishing to be bound by theory, it is believed that this occurs because these saccharides tend to bind increased amounts of water into the system while maintaining a lower water activity. If the total amount of the monosaccharide mixture is significantly more than about 45%, conventional starch gelatinization during baking and recrystallization thereafter occurs which leads to a product with a crumbly texture which ages and stales rapidly. If the total amount of the monosaccharide mixture in the present invention is less than about 25% (and the monosaccharides are replaced with sucrose) the resulting product would still have a tender eating quality but the product would have a somewhat drier texture.

The saccharide mixture also comprises from about 10 to about 50%, preferably from about 10 to about 35% of glucose-based disaccharides, trisaccharides, or mixtures thereof. These are sugars which consist of two and three glucose units, respectively, joined by a glycosidic linkage. The glucose-based disaccharides employed in the present invention are maltose, isomaltose, and mixtures thereof. The glucose-based trisaccharides which provide the best results in the present invention are maltotriose and other isomers of glucose-based trisaccharides. These other isomers are those naturally occurring isomers which result from the acid or enzymatic hydrolysis of starch, especially corn starch. These di- and trisaccharides have some influence in reducing the sweetness of this sugar system, but have relatively little effect on the texture of the product. Since these saccharides do not bind water to the system as effectively as the monosaccharides, a product baked with a level of di- and trisaccharides higher than 50% (and with a corresponding lower level of monosaccharides) would be a sticky product. On the other hand, a product baked with a level of di- and trisaccharides that is lower than 10% (with a correspondingly higher level of monosaccharides) would tend to stale easily.

The saccharide mixture also comprises from about 4 to about 9%, preferably from about 6 to about 8%, of glucose-based tetrasaccharides and saccharides with even higher degrees of polymerization, for example, maltotetrose. These saccharides provide chewiness to the final baked product. However, using these saccharides at a level higher than about 9% of the sugar component, would result in a gummy product with an undesirable mouthfeel and reduced "sweetness". If these saccharides are present in the product at less than 4%, the result is a product that has less cohesion and is somewhat more crumbly, or less chewy than is desirable.

Finally, the saccharide mixture comprises from about 15 to about 60%, preferably from about 30 to about 55%, sucrose. This saccharide provides the desirable sweetness intensity and sweetness profile to the baked product without adverse effect on texture. A product baked with only sucrose will stale by the mechanism of sucrose crystallization and is thus less desirable than a product baked with the saccharide mixture of the present invention.

The saccharide mixture of the present system can be formulated from the individually named sugars. However, since some of the saccharides are not readily available and some of those that are available are costly, the sugar component is preferably obtained by blending together corn syrups and sucrose. Corn syrups are products resulting from the hydrolytic action of either acid, enzyme or a combination of both, on starch slurries. In this process, starch is converted into a mixture of mono-, di-, tri-, tetra- and higher saccharides. It is the relative proportions in which these various sugars are present that give each type of corn syrup its special characteristics. High fructose corn syrup can alternatively be prepared by introducing isomerase enzymes into glucose, thereby converting it into fructose.

Preferably, a saccharide mixture with the levels of mono-, di-, tri-, and higher saccharides of the present invention may be prepared by combining particular amounts of a high fructose corn syrup, a high maltose corn syrup or conventional corn syrup and sucrose. Suitable high fructose corn syrups useful herein contain either about 42% fructose, about 55% fructose, or about 90% fructose on a sugar solids basis. Suitable high maltose corn syrups and certain conventional corn syrups contain from about 30 to about 75% combined maltose, isomaltose, maltotriose and other isomers of glucose-based trisaccharides, on a sugar solids basis. Examples of suitable commercially-available high maltose corn syrups are Neto ® 7300 and 7350, available from A. E. Staley Manufacturing Company. Examples of suitable commercially-available corn syrups are Amaizo ® DE54 and DE62, available from American Maize Products Company. An example of a high fructose corn syrup useful herein is Isosweet 100 ®, available from A. E. Staley Manufacturing Company, which contains about 42% fructose.

Sugar components of the present invention can typically be prepared from blends of from about 30 to about 35% of high fructose corn syrup, from about 20 to about 25% high maltose corn syrup, and about 40 to about 50% sucrose on a sugar solids basis. For example, about 22% of high maltose Neto ® 7350, combined with about 33% of high fructose Isosweet 100 ®, and about 45% of dry granulated sucrose would give a saccharide mixture that consists of about 14% fructose, about 19% glucose, about 11% maltose, about 45% sucrose, about 5% maltotriose and about 6% tetra- and higher saccharides.

The saccharide mixture of the present invention could alternatively be produced by introducing enzymes (invertase) into a sucrose solution and allowing the mixture to stand until a desired amount of fructose and glucose is formed. This combination of sucrose and fructose and glucose can then be mixed with an appropriate amount of high maltose corn syrup to form the saccharide mixture. In addition, the sucrose-high fructose/glucose solution could be blended with a mixture of starch and enzymes (amylase-type) that has had sufficient standing time to convert to high maltose corn syrup. Alternately, the inclusion of invertase in the dough to convert sucrose to fructose is taught in U.S. Pat. No. 4,344,969, Youngquist et al., issued Aug. 17, 1982, incorporated by reference.

The saccharide mixture can also be prepared from about 25 to about 45% of a mixture of dry fructose and dry glucose, from about 15 to about 60% of dry sucrose, from about 15 to about 35% dry maltose and/or maltotriose, and from about 4 to about 9% dry corn syrup solids of tetra- and higher saccharides. For example, a combination of about 19% dry glucose available from A. E. Staley Manufacturing Company, about 14% crystalline fructose available from Süddentsche Zucker-Aktiengesellschaft Mannheim, about 50% dry sucrose available from Colonial Sugar Company, about 10% maltose monohydrate available from Sigma Chemical Company, and about 8% Maltrin M205 ® available from Grain Processing Company, would be suitable.

While not intending to be limited by theory, it is believed that this unique combination of saccharides used in the baked snack products of the present invention alters the typical starch gelatinization and subsequent recrystallization process so that the products do not "stale" as conventional baked products do. Products made with this unique sweetener component enjoy an extended shelf life.

Water Activity

A second key feature of the present invention is the low moisture content and low water activity of the final baked product compared to conventional fresh baked products which are not shelf stable. The present invention encompasses a baked product with a water activity of from about 0.40 to about 0.75 (as measured prior to packaging). Preferably, the water activity should be from about 0.45 to about 0.70. By "water activity" ($A_w$) is meant the ratio of the fugacity of water in the system being studied to the fugacity of pure water at the same temperature. The water activity of the products and compositions herein can be measured using well-known physical and chemical techniques and commercially available instruments. A baked product with a high water activity has more water available for spore germination and microbial growth. At an $A_w$ value of greater than about 0.75 bacterial growth may develop and at an $A_w$ value of greater than about 0.65 mold growth may develop. Keeping the water activity of the baked goods of the present invention at a level of 0.65 or less avoids most problems of mold or bacterial growth. However, these baked goods could be made with an $A_w$ value as high as 0.8 if it is acceptable to use preservatives that inhibit mold or bacterial growth. Alternatively, baked goods with this higher $A_w$ could be cold stored or stored in the frozen state to avoid such spoilage.

Keeping the water activity of the snack foods of the present invention low is believed to alter the starch gelatinization process during baking and the subsequent starch recrystallization process during cooling. This feature, along with the contribution of the unique sugar system, surprisingly keeps the products of the present invention from "staling", while still providing a moist, chewy texture.

Starch Component

Flour provides the starch component in the baked products of the present invention (since the major component of most flours is starch). The flour may be any finely comminuted meal of any cereal grain or edible seed, or mixtures thereof, as are known by one skilled in the art of baking. Typical non-limiting examples include wheat flour, barley flour, rye flour, cornstarch and corn flour, triticale, and also the so-called synthetic flours, which incorporate such materials as starch and soy protein isolate, with or without heat and/or steam treatment. The wheat flours are most typically employed in baking. They consist of several types including hard red spring, hard red winter, soft red winter and white winter and spring. They are distinguished by differences in gluten quality, water absorption and protein content. Protein in these flours can vary from about 7% to about 14%, with the soft wheat flours having protein contents at the lower end of that range and hard winter wheat flours having protein contents at the upper end of that range. Isolate starch is another source of the starch component for these baked products. Isolate starch contains substantially no protein.

The amount of protein in a baked good influences its texture and tenderness. The primary source for protein in baking is egg. However, since flour also contains some protein, the type of flour used in baking can influence the final product's texture somewhat. The higher the protein content in a flour the tougher texture a product baked with that flour will have.

Though sweetened bakery goods like cakes and cookies of the type disclosed in the present invention are generally made of flours with a low protein content, the products of the present invention are preferably made by diluting a wheat flour having a high protein content with starch to a ratio of flour to starch of about 1:1. Preferably, a wheat starch is used, but other suitable starches include corn, waxy maize, potato, tapioca and rice starches. Part of the wheat flour used in baking the products disclosed herein may also be replaced with flour made from other grains as mentioned above. For example, for a snack with a "healthy" food image part or all of the wheat flour might preferably be replaced with oat flour, oatmeal or bran. Alternatively, a corn muffin could be prepared by replacing part of the flour with corn meal.

The level of the starch component of the present invention is from about 15 to about 35%. The level of the starch component is such that the ratio of the amount of the total saccharide mixture to the amount of the total starch component in the final baked product is from about 1:1 to about 4.5:1, preferably from about 1.4:1 to about 3.0:1.

Shortening Component

Shortening, in the form of oil or a higher melting fat, is generally included in baked goods of the type disclosed in the present invention. Shortenings contribute flavor and texture to baked goods. The shortenings that can be employed in the present invention are well known by one skilled in the art of baking and include solid or plastic, as well as liquid or semi-fluid, glyceride shortenings derived from animal, vegetable fats and oils including synthetically prepared shortenings. These glycerides can contain saturated or unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like and are generally obtained from edible oils and fats such as corn oil, cottonseed oils, soybean oil, coconut oil, rapeseed oil, peanut oil, olive oil, palm oil, palm kernel oils, sunflower seed oil, wallflower oil, lard, tallow and the like. These glycerides can also contain, in part, one or two short-chain acyl groups having from 2 to about 6 carbon atoms such as acetyl, propanoyl, valeryl, and caproyl; they can be prepared by random or low-temperature interesterification reactions of fatty triglyceride containing oils and fats such as interesterified or rearranged cottonseed oil and lard; and they can be otherwise formed by various organic syntheses.

Some preferred shortenings are soybean-base shortenings or oils, hydrogenated soybean-based shortening or oil, corn oil, palm oil, hydrogenated palm oil, lard and tallow oils. Of these, "Crisco" brand shortening or oil, which is soybean-based, is preferred. "Crisco" oil or shortening is commercially available from The Procter & Gamble Company. The amount of shortening in the baked goods of the present invention is from about 10 to about 25%. A particularly desirable shortening for use in the present invention is that disclosed in U.S. Application Ser. No. 722,533, Seiden, filed Apr. 12, 1985, which is incorporated by reference herein.

Eggs and Other Miscellaneous Components

Preferably, fresh whole eggs are used in making the baked products of the present invention. Eggs impart flavor, richness and color to the baked goods. On the average, an egg contains about 73% water and about 27% egg solids. The egg solids comprise about 48% protein, about 44% fat, and about 8% minor materials. Alternatively, egg solids, particularly egg albumen and dried yolk, may be used in baking the products disclosed herein. Soy isolates, whey protein concentrates, or other egg substitutes may also be used herein in combination with, or in place of the egg solids. Such substitutes are well known to those skilled in the art of baking. From 0 to about 6%, preferably, from about 0.1 to about 6%, on a dry solids basis, of the formulation for the products of the present invention should comprise egg or egg substitute.

Chemical leavening agents can also be added to the compositions of the present invention to provide aeration to the final product. Examples include a baking soda, e.g. sodium, potassium, or ammonium bicarbonate, alone or in combination with a baking acid, preferably sodium aluminum phosphate, monocalcium phosphate, dicalcium phosphate or mixtures thereof. The selection of the leavening system is within the knowledge of one skilled in the art. From 0 to about 2%, preferably, from about 0.1 to about 2%, of the formulation for the products of the present invention will typically be leavening agent.

Additional components can be added to the batter or dough of the present invention prior to baking to provide a wide variety of snack products. Additives may be of a type that remain as whole pieces in the snack product. Such additives include, but are not limited to, chocolate, peanut butter or butterscotch chips or chucks; fruit or fruit-flavored bits, such as blueberry, strawberry, or citrus flavored bits as disclosed in U.S. Pat. No. 3,794,741, Weigle, issued Feb. 26, 1974, which is herein incorporated by reference; other fruit flavored bits, such as cherry, blackberry, apricot, raisin, date, or apple; cereals, such as bran or oatmeal; and nutmeats including the whole or chopped meat of any edible nut including walnuts, black walnuts, hickory nuts, hazel nuts, brazil nuts, peanuts, macadamia nuts, pecans, almonds, cashews, coconut and the like. From 0 up to about 40% of the final baked product of the present invention can be such additives.

Other components of a type that are blended into the dough or batter prior to baking may be incorporated to add flavor, aroma, and color to the final baked product. For example, peanut butter; spices, such as cinnamon, mace, nutmeg, caraway, anise, allspice, poppy seed, coriander, ginger, cloves, fennel, and salt; and flavorings, such as banana, orange, lemon, mint or vanilla. Honey or molasses may also be used in the present invention but the levels of the individual sugars in the saccharide mixture must be altered to account for the sugars in the molasses or honey. Mixtures of these flavorings and whole piece components can be added to provide a variety of desirable products. Up to about 25% of the final baked product of the present invention can be comprised of such additives. The exact amount added for any of these flavoring components (whether they are of the type that is blended into the composition or the type that remain as whole pieces) will depend on personal preference and on what particularly is being added.

For a chocolate snack product, cocoa is incorporated into the dough or batter prior to baking. The cocoa used in this invention can be processed from either natural or "Dutched" chocolate from which a substantial portion of the fat or cocoa butter has been expressed or removed by solvent extraction, by pressing, or by other means known to those skilled in the art. Cocoa suitable for use in the practice of this invention may contain from about 1% to about 30% fatty constituents.

Dutched chocolate is prepared by treating cocoa nibs with an alkali material, such as potassium carbonate, in a manner well known in the art. Generally, it tends to have a darker color and also can be more flavorful than natural cocoas.

Chocolate can be used in practicing the present invention and it is intended, therefore, that chocolate, as described above, is to be encompassed by the term "cocoa." When chcocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide equivalent flavoring and coloring.

The basic components and the optional components that make up the baked goods of the present invention can be combined in a number of slightly different ways to yield different types of baked goods. Obviously, the amount and type of flavorings, spices, or whole piece components, such as chocolate chips, nuts, etc., can be manipulated to vary the products. Different icings or streusel toppings can also be added for variation. Additionally, the texture of these products can be altered to yield different types of product. This is done through the manipulation of the total protein content in the composition of the baked good. It is the protein content that gives a baked product its structure. Two important sources of protein are found in baked goods, protein in the flour, and protein in the egg (or egg substitute). A brownie or cookie, which tends to be a denser product, contains a limited amount of protein. A snack cake or muffin is characterized by a lighter, airier structure. Additional protein must be added to create a product with this type of texture. The preferred source for this added protein is egg white. Other acceptable sources of protein that will give the product this lighter, airier texture include, but are not limited to, non-fat milk solids, casein, sodium caseinate, calcium caseinate, modified casein, sweet dairy whey, modified whey, and whey protein concentrate. For each product, the components can be combined with, for example, any planetary bowl mixer, ribbon blender, or other conventional mixer.

Pre-Mix

One aspect of the present invention is a culinary pre-mix product for which the consumer completes preparation. One embodiment of this would be a pre-mix in the form of a dry mix of the components. Such a dry mix could be made by combining only the starch and unique saccharide mixture component of the present invention. The consumer can then add a specified amount of shortening or oil, water, eggs, leavening, salt, and flavorings and bake the resulting batter to form the desired product. A preferred dry mix includes the saccharide mixture, flour and or starch, and shortening, leavening, salt, and flavorings. The consumer would then need to add only fresh egg and water to the mix and bake the batter to form the desired product. Such a form of pre-mix would be especially suitable for sale to a consumer for baking in the home.

A dry pre-mix more suitable for sale to a commercial baker would also include dry egg solids in the mix so that the baker would only need to add water to form the batter for baking. A pre-mix of this type would comprise from about 20 to about 60%, preferably from about 35 to about 45%, of a saccharide mixture, which comprises, by weight of said saccharide mixture: (1) from about 25 to about 45%, preferably from about 30 to about 35%, monosaccharides, selected from the group consisting of glucose, fructose, and mixtures thereof; (2) from about 10 to about 50%, preferably from about 10 to about 35%, of glucose-based di- and triscaccharides; from about 4 to about 9%, preferably from about 6 to about 8%, glucose-based tetra- and higher saccharides; and from about 15 to about 60%, preferably from about 30 to about 55%, sucrose. The pre-mix also comprises from about 15 to about 35% of a starch component, so that the saccharide to starch ratio of the pre-mix is from about 1.4:1 to about 3.0:1. The pre-mix also comprises from about 10 to about 25% of a shortening component, from 0 to about 6%, preferably from about 0.1 to about 6%, on a dry solids basis, of an egg component, and from 0 to about 2%, preferably from about 0.1 to about 2%, of a leavening agent. The water activity of the dry pre-mix is from about 0.2 to about 0.4.

For any of these formulations of the pre-mix, the amount of liquid added to the dry mix would be such that, after baking, the water activity of the baked snack product would be between about 0.40 and 0.75. If mixed and baked in the home, the product would, most likely, not be stored in a moisture tight container. Thus, staling would occur eventually as moisture was lost from the product. The present product is more desirable than a conventionally baked product in that it stays fresh longer. However, if the dry pre-mix were sold to a commercial baker, and after preparation the baker packaged these goods in a moisture tight container, the product would enjoy maximum extended storage times.

To assure that a preferred product results from such a dry pre-mix, the sugar and flour components may be co-milled prior to mixing with other components. This procedure is disclosed in U.S. Pat. No. 3,694,230, Cooke, issued Sept. 26, 1972, which is herein incorporated by reference.

Preferably, from about 0.1 to about 10% of an emulsifier should be added to the dry pre-mix. Suitable emulsifiers include, but are not limited to, lactylated mono- and diglycerides, propylene glycol monoesters, polyglycerol esters, sorbitan esters, diacetylated tartaric acid esters of mono- and diglycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof.

Polyglycerol esters suitable for use as emulsifiers in the present invention have an average of from 2 to 10 glycerol units and from 1 to 3 fatty acyl groups of from 14 to 18 carbon atoms per glycerol moiety.

Preferably, the emulsifier is first dissolved in the oil or fat to produce an emulsified shortening. For best results, the emulsifier is melted and added to the shortening at a temperature above the melting point of the emulsifier to insure a homogeneous blend.

A preferred shortening/emulsifier system is that disclosed in U.S. Pat. No. 4,456,626, Nelson et al., issued June 16, 1984, incorporated by reference herein. The shortening contains an emulsifier consisting essentially of a hydrophilic polyglycerol monoester and a propylene glycol monoester, wherein the fatty acids used to esterify the polyglycerol ester and propylene glycol esters have from about $C_{16}$-$C_{22}$ carbon atoms, the ratio of propylene glycol monoester to polyglycerol ester being from about 2:1 to about 7:1. The remainder of the shortening system is fats, oils or hydrogenated fats and oils.

Any conventional methods of incorporating the emulsifier and shortening into the flour, sugar, leavening agent, and additional ingredients can be used to produce the pre-mix. For example, the emulsified shortening and other ingredients can be combined with the sugar, flour or co-milled sugar/flour mixture by admixing these components in, for example, a planetary bowl mixer, a ribbon blender, a high-speed rotary mixer, or in other conventional mixers. Preferably, however, the shortening containing the emulsifier is first mixed with the sugar-flour mixture to form an essentially homogeneous sugar-flour-shortening-emulsifier blend, and then the additional ingredients are admixed with this blend.

Packaging of the dry pre-mix product in a sealed plastic film is sufficient. Since the water activity of the dry-mix is essentially nil, i.e., from about 0.2 to about 0.4, there is little concern about microbiological growth with extended storage periods. Packaging must be done using generally accepted good manufacturing practices for foodstuffs.

A second embodiment in the form of a culinary pre-mix product would be a pre-mix in the form of a wet-batter which incorporates all of the components necessary to make the baked snack products of the present invention. The components of such a wet-batter pre-mix would be the same as those in the dry pre-mix, except that the pre-mix would additonally comprise water. The water should be added so as to make the water activity of the mix from about 0.65 to about 0.80, preferably from about 0.70 to about 0.75.

The consumer need only bake a measured amount of batter for a prescribed amount of time at a prescribed temperaure to arrive at the baked ready-to-eat snack products described herein. The water activity of the wet batter is high enough to possibly permit bacterial and mold growth. Therefore, a preservative should preferably be incorporated in such a wet batter composition to assure a premium final baked product. Suitable preservatives include calcium sorbate and calcium propionate. From 0 to about 2%, preferably from 0.1 to about 2%, of the preservative should be added. The emulsifier as described above for the dry pre-mix should be incorporated into the wet batter mix in the same kind, manner, and amount as was done for the dry pre-mix. Packaging this product in a sealed plastic film which provides moisture barrier protection is sufficient. Again, this packaging must be done using generally accepted good manufacturing practices for foodstuffs. These premixes can be distributed in refrigerated or frozen form.

Baked Products

The components of the present invention as described above can be formulated in several slightly different ways to yield various types of baked goods including, but not limited to, brownies, snack cakes, muffins, and cookies, all of which are within the scope of the present invention. The batter or dough of the desired snack product can be baked using radiant, conductive or convective exposure to energy of a type which imparts thermal energy to the product being baked such as conventional, convection, microwave oven baking or combinations thereof. Baking times and temperatures are dependent on the type of oven used and the type of product being baked. Baking the products does not significantly influence the sugar distribution of the various saccharide mixtures, the saccharide to starch ratio, or the protein to saccharide ratio of these products. The products may be baked in batch or continuous ovens.

To realize a maximum shelf life for any of the final baked products prepared according to the present invention, packaging which allows no moisture to pass from the snack product to the environment or vice versa is desirable. A product packaged in this way would not be degraded at all whether stored in conditions of low or high humidity. Packaging which allows for microwave heating of the product prior to eating, such packaging at the same time being moisture tight, would be most desirable. The packaging should be done using generally accepted good manufacturing practices.

A baked snack product of the present invention in the form of a moist, chewy brownie is made by keeping the moisture present in the snack batter composition at a level that will yield a baked product with a water activity between about 0.60 and 0.65. The brownie comprises from about 20 to about 60% of the saccharide mixture described above, from about 15 to about 35% of a starch component, from about 10 to about 25% shortening, from 0 to about 6%, preferably, from about 0.1 to about 6%, on a dry solids basis, of an egg component, from about 0.1 to about 2% of a leavening agent, and from 0 to about 5% of salt and miscellaneous additives. The composition contains a level of protein between about 0.1% and about 2.5%. By "brownie" is meant both chocolate-flavored and vanilla-flavored brownies, also known as "blondies." When blondies are made, cocoa is omitted and flour may be substituted for the cocoa. Vanilla or similar flavors are added to the batter mix.

The desired components are combined using any conventional batch-type method. For example, the dry ingredients (flour, starch, leavening, cocoa, etc.) are first combined, the sucrose, and about three-quarters of the fat component are mixed together just until blended; these components are then combined with the dry ingredients until all of the dry components are moistened; the rest of the fat component is then mixed in; and finally the egg and corn syrups are mixed into the batter until blended (mixing in this order assures that the shortening component will be well dispersed in the batter). The water activity of the wet batter prior to baking should be between about 0.7 and 0.8. The batter is then baked in a suitable pan, such as a cake pan that has been oiled, at between 325° F. (163° C.) and 375° F. (191° C.), for about 20 to about 40 minutes. Appropriate baking temperatures and times are easily chosen by one skilled in the art of baking. The resulting brownie can also be iced.

A baked snack product of the present invention in the form of a snack cake can be made in substantially the same manner that the brownie is prepared. However, additional protein is added to give the product a lighter, airier texture. The snack cake comprises from about 20 to about 60% of the saccharide mixture described above, from about 15 to about 35% of a starch component, from about 10 to about 25% shortening, from 0 to about 6%, preferably from about 0.1 to about 6%, on a dry solids basis, of an egg component, from about 0.1 to about 2% of a leavening agent, and from 0 to about 5% of salt and miscellaneous additives. This composition contains a level of protein of between 0.5 and about 5%. The added protein should preferably be mixed into the batter with the fresh whole egg or egg solids (referred to above as the "egg component"), and the corn syrups. The batter should have a water activity of between about 0.7 and about 0.8 prior to baking. The snack cake batter is baked in a suitable pan, such as a cake pan that has been oiled, at between about 325° F. (163° C.) and about 375° F. (191° C.), for about 20 to about 40 minutes. The $A_W$ value for the snack cakes should be between about 0.60 and about 0.65 after baking. The resulting snack cake can also be iced or topped with a streusel topping.

A baked snack product of the present invention in the form of a muffin can be made in basically the same way as the snack cake. The muffin comprises from about 20 to bout 60% of the saccharide mixture (with the breakdown of individual sugars as discussed above), from about 10 to about 30% fat, from 0 to about 6%, preferably from 0.1 to about 6%, on a dry solids basis, of an egg component, from about 0.1 to about 2% leavening agent, and from 0 to about 5% of salt and miscellaneous additives. This composition contains a level of protein between 0.5 to about 5%. Part of the wheat flour used in making these muffins can be replaced with flour made from a different grain such as oats. Alternatively, bran may be used to replace part of the wheat flour. The water activity of the muffin batter before baking and of the baked muffin should be about the same as for the snack cake batter and baked snack cake described above. The muffin batter is baked in a suitable pan, such as a muffin tin that has been oiled, at from about 350° F. (177° C.) to about 400° F. (204° C.) for about 15 to about 30 minutes. A streusel topping can optionally be added to the muffin prior to baking.

A baked snack product of the present invention in the form of a moist, soft cookie can be made by simply dropping desired amounts of brownie batter at spaced intervals on a cookie sheet and baking at from about 350° F. (177° C.) to about 375° F. (191° C.), for about 7 to about 8½ minutes. Therefore, the cookie comprises the same ingredients as the brownie as set forth above. The water activity of the baked cookies should preferably be between about 0.50 and about 0.65.

ANALYTICAL PROCEDURES

The method of determining the types and amounts of sugars present in a baked, sweetened snack product is set forth below:

All icing or topping, nuts and other whole flavoring additives are removed from the sample to be analyzed. Five grams of the sample are then mixed with 35 mls of hot distilled water (50° C.). This solution is immediately homogenized at the maximum setting on a Tekmar Tissuemizer ® for 30 seconds. The homogenized solution is then centrifuged with a Beckman Model J2-21 Centrifuge at 10,000 rpm for 45 minutes at room temperature (18°–24° C.). This causes the sample to settle into three layers, a solid bottom layer, a fatty top layer, and an aqueous solution. A 7 ml aliquot of the resulting aqueous layer is then passed through a pre-conditioned (4 mls of methanol followed by 10 mls of water) Waters $C_{18}$ Sep Pak ®. This procedure allows for the filtration of any non-water soluble substances in the aqueous solution. The initial 4 mls of sample that passes through the Sep-Pak ® is discarded to avoid dilution. The remaining 3 mls are retained for analysis. The samples are then filtered through a 2 micron filter.

The sample solution is analyzed for short chain sugars. A Spherisorb ® NH$_2$ (5 m), 25 cm×4.6 mm, high pressure liquid chromatography column obtained from Phase Separations Ltd. is used. Sugars are detected with a Waters 410 Refractive Index Detector and the areas for each sugar peak are determined by electronic integration. The mobile phase flow-rate is maintained at 3 ml/min, the amount injected onto the column is 10 μl and the mobile phase used in the column is an 85% CH$_3$CN/15% H$_2$O solution.

Samples are analyzed for longer chain oligosaccharides with a Dextropak ® (Waters-Radial-Pak) high pressure liquid chromatography column. Sugars are detected with a Waters 410 Refractive Index Detector and the areas for each sugar peak are determined by electronic integration. The mobile phase flow-rate is maintained at 1 ml/min, the amount injected onto the column is 30 μl, and the mobile phase used in Milli-Q water (purified, de-ionized water).

The HPLC instrument is calibrated each time samples are tested by analyzing a series of sucrose solutions under the same conditions. A calibration curve is calculated by linear regression analysis of the integrated peak areas versus the known concentrations (0.4, 0.8, 8 and 16 mg/ml) of the sucrose solutions. The form of the calibration curve is peak area=slope×concentration+intercept. The amount of each sugar present in a test sample is calculated from the regression equation for the calibration curve according to the formula:

$$\% \text{ sugar} = \frac{(\text{peak area} - \text{intercept})}{(\text{slope})} \times \frac{37000}{\text{Sample height}}$$

The following examples illustrate the broad applicability of the present invention. It will be appreciated that other modifications of the present invention, within the skill of those in the baking arts, can be undertaken without departing from the spirit and scope of this invention.

EXAMPLE I

Chocolate brownies are prepared by the following method:

| Ingredient | Amount (gms) |
| --- | --- |
| Wheat starch (Ogilvie Mills) | 44.02 |
| Velvet bleached cake flour (International Multifoods) | 158.20 |
| Salt | 6.58 |
| Baking Soda | 0.14 |
| Cocoa | 70.46 |
| Vanilla powder | 0.78 |
| Carrageenan | 0.82 |
| Granulated sucrose (Amalgamated Sugar Co.) | 187.30 |
| Crisco ® Shortening (The Procter & Gamble Company) | 89.24 |
| Crisco ® Oil (The Procter and Gamble Company) | 89.24 |
| Fresh whole egg | 96.00 |
| Isosweet 100 ® corn syrup (29% H$_2$O) (A. E. Staley Co.) | 193.44 |
| Neto 7350 ® corn syrup (19.3% H$_2$O) (A. E. Staley Co.) | 113.46 |

The wheat starch, flour, salt, baking soda, cocoa, vanilla, and carrageenan are first mixed together in a mixer bowl with a Hobart Model C-100 mixer at speed #1 for about 4 minutes (the bowl is scraped with a rubber spatula about half-way through the mixing). The mixture is then placed in a plastic bag and mixed again with rotation of the bag to improve ingredient distribution. The sucrose, shortening, and about half of the oil are then blended together in the mixer bowl at speed #1 for about 45 seconds. The dry mix in the plastic bag is then added to the ingredients in the bowl and the mixer is operated for about 45 seconds. The remainder of the oil is then added and the mixer is operated for about 30 seconds. The egg and corn syrups are then added and the mixer is operated for about 45 seconds. Throughout the mixing process the mixer bowl is scraped frequently with a rubber spatula, especially after the addition of ingredients. 505 grams of the batter is then placed in an 8"×8" oiled cake pan. The water activity of the batter is between 0.70 and 0.74. The pan is placed in a conventional General Electric deck oven and the batter is baked for 28–30 minutes at 350° F.

The water activity of the baked brownie is between 0.58 and 0.65. The total percentage of saccharides in the baked brownies is about 40%. Of this amount about 33% is comprised of monosaccharides, about 16% is comprised of di- and trisaccharides, about 6% is comprised of higher saccharides and about 45% is comprised of sucrose. About 19% of the baked brownie comprises starch so that the saccharide to starch ratio of the brownies is about 2:1. About 18% of the baked brownie comprises fat. About 2.2% of the baked brownie comprises protein.

These brownies are particularly desirable because of their moist chewy texture which is not gummy or tacky and which allows for fast mouth dispersion upon eating. This product will retain these fresh baked characteristics at all stages of shelf life for up to a year or more. To assure that the A$_w$ of the brownies remains at this desirable level, so that these fresh baked characteristics are maintained, the brownie is packaged in a moisture tight package.

Substantially similar results are obtained if the velvet bleached cake flour and wheat starch of this example are replaced with a one to one mixture of hard wheat flour and wheat starch. Substantially similar results are obtained if part or all of the wheat flour of this example is replaced with a synthetic flour, triticale, oat flour and corn flour. Substantially similar results are obtained if the Isosweet 100 ® and Neto 7350 ® corn syrups of this example are replaced with 148.26 grams of Amaizo ® DE 62 and 123.55 grams of dry fructose obtained from Süddentsche Zucker-Aktiengesellschaft Mannheim.

EXAMPLE II

Chocolate snack cakes are prepared by the following method:

| Ingredient | Amount (gms) |
| --- | --- |
| Wheat Starch (Ogilvie Mills) | 44.02 |
| Velvet bleached cake flour (International Multifoods) | 158.20 |
| Salt | 6.58 |
| Baking Soda | 0.14 |
| Cocoa | 70.46 |
| Vanilla powder | 0.78 |
| Carrageenan | 0.82 |
| Granulated sucrose (Amalgamated Sugar Co.) | 187.30 |
| Crisco ® Shortening (The Procter & Gamble Co.) | 89.24 |
| Crisco ® Oil (The Procter & Gamble Company) | 89.24 |
| Fresh whole egg | 96.00 |

| Ingredient | Amount (gms) |
| --- | --- |
| Fresh egg white | 60.00 |
| Isosweet 100 ® corn syrup (29% H$_2$O) (A. E. Staley Co.) | 193.44 |
| Neto 7350 ® corn syrup (19.3% H$_2$O) (A. E. Staley Co.) | 113.46 |

The wheat starch, flour, salt, baking soda, cocoa, vanilla, and carrageenan are first mixed together in a mixer bowl with a Hobart Model C-100 mixer at speed #1 for about 4 minutes (the bowl is scraped with a rubber spatula about half-way through the mixing). The mixture is then placed in a plastic bag and mixed again with rotation of the bag to improve ingredient distribution. The sucrose, shortening, and about half of the oil are then blended together in the mixer bowl at speed #1 for about 45 seconds. The dry mix in the plastic bag is then added to the ingredients in the bowl and the mixer is operated for about 45 seconds. The remainder of the oil is then added and the mixer operated for about 30 seconds. The whole egg, egg white, and corn syrups are then added and the mixture is operated for about 45 seconds. Throughout the mixing process the mixer bowl is scraped frequently with a rubber spatula, especially after the addition of ingredients. 505 grams of the batter is then placed in an 8"×8" oiled cake pan. The water activity of the cake batter is between about 0.70 and 0.74. The pan is placed in a conventional General Electric deck oven and the batter is baked for 28-30 minutes at 350° F.

The water activity of the baked snack cake is between about 0.60 and 0.70. The total amount of saccharides in the baked product is about 37.5%, of this amount about 33% is comprised of monosaccharides, about 16% is comprised of di- and trisaccharides, about 6% is comprised of higher saccharides and about 45% is comprised of sucrose. About 18% of the baked snack cake comprises starch so that the saccharide to starch ratio of the snack cake is about 2.1. About 17% of the baked snack cake comprises fat. About 2.4% of the baked snack cake comprises protein.

The snack cake is particularly desirable because of its moist yet light texture. The consistency of the cake is not gummy or tacky and the cake disperses quickly in the mouth upon eating. This product will retain these fresh baked characteristics at all stages of stages of shelf life for up to a year or more. To assure that the A$_w$ of the snack cake remains at this desirable level, so that these fresh baked characteristics are maintained. The snack cake is packaged in a moisture tight package.

Substantially similar results are obtained if the velvet bleached cake flour and wheat starch of this example are replaced with a one to one mixture of hard wheat flour and starch. Substantially similar results are also obtained if all or part of the wheat flour of this example is replaced with a synthetic flour, titricale, oat flour or corn flour. Substantially similar results are also obtained if the Isosweet 100 ® and Neto 7350 ® corn syrups of this example are replaced with 148.26 grams of Amaizo ®DE 62 and 123.55 grams of dry fructose obtained from Suddentsche Zucker-Aktiengesellschaft Mannheim.

EXAMPLE III

"Blond" brownies are prepared by the following method:

| Ingredients | Amount (gms) |
| --- | --- |
| Wheat starch (Ogilvie Mills) | 43.36 |
| Velvet Bleached Cake Flour (International Multifoods) | 229.38 |
| Salt | 6.60 |
| Baking Soda | 0.14 |
| Dextrose (A. E. Staley Co.) | 8.04 |
| Vanilla powder | 0.82 |
| Carragenan | 0.80 |
| Granulated sucrose (Amalgamated Sugar) | 187.30 |
| Crisco ® Shortening (The Procter & Gamble Company) | 89.24 |
| Crisco ® Oil (The Procter & Gamble Company) | 89.24 |
| Fresh whole egg | 96.00 |
| Isosweet 100 ® corn syrup (29% H$_2$O) (A. E. Staley Co.) | 193.44 |
| Neto 7350 ® corn syrup (19.3% H$_2$O) (A. E. Staley Co.) | 113.46 |

The "blond" brownie is mixed and baked in the same manner as the brownie of Example I.

The baked "blond" brownie has an A$_w$ of between 0.65 and 0.70 and a total saccharide content of about 40%, of this amount about 34% is comprised of monosaccharides, about 16% is comprised of di- and trisaccharides, about 6% is comprised of higher saccharides, and about 44% is comprised of sucrose. About 26% of the baked brownie is comprised of starch. The saccharide to starch ratio of the brownie is about 1.5. About 18% of the baked brownie comprises fat. About 2.7% of the baked brownie comprises protein.

The resulting product is a vanilla flavored "brownie" with a moist chewy texture which is not gummy or tacky. The product allows for fast mouth dispersion upon eating. This product will retain these fresh baked characteristics at all stages of shelf life for up to a year or more. To assure that the A$_w$ of the blond brownie remains at this desirable level, the brownie is packaged in a moisture tight package.

Substantially similar results are obtained if the velvet bleached cake flour and wheat starch of this example are replaced with a one to one mixture of hard wheat flour and wheat starch. Substantially similar results are also obtained if all or part of the wheat flour of this example is replaced with a synthetic flour, triticale, oat flour, or corn flour. Substantially similr results are also obtained if the Isosweet 100 ® and Neto 7350 ® corn syrups of this example are replaced with 148.26 grams of Amaizo ® DE 62 and 123.55 grams of dry fructose obtained from Süddentsche Zucker-Aktiengesellschaft.

EXAMPLE IV

Muffins are prepared by the following method:

| Ingredient | Amount (gms) |
| --- | --- |
| Wheat Starch (Ogilvie Mills) | 43.36 |
| Velvet Bleached Cake Flour (International Multifoods) | 229.28 |
| Salt | 6.60 |
| Baking Soda | 0.14 |
| Dextrose (A. E. Staley Co.) | 8.06 |
| Vanilla powder | 0.82 |
| Carrageenan | 0.80 |
| Granulated Sucrose (Amalgamated Sugar Co.) | 187.30 |
| Crisco ® Shortening (The Procter & Gamble Company) | 89.24 |
| Crisco ® Oil (The Procter & Gamble Company) | 89.24 |
| Fresh whole egg | 96.00 |
| Fresh egg white | 60.00 |

| Ingredient | Amount (gms) |
| --- | --- |
| Isosweet 100 ® corn syrup (29% H₂O) (A. E. Staley Co.) | 193.44 |
| Neto 7350 ® corn syrup (19.3% H₂O) (A. E. Staley Co.) | 113.46 |

The muffins are prepared in the same manner as the snack cake of Example III except that the batter is baked in oiled muffin baking cups (about 50 g per cup). The muffins are baked at 400° F. for 15-20 minutes.

The water activity of the baked muffin is between 0.60 and 0.66. The total saccharide mixture of the baked muffin is about 38%. Of this amount, about 34% is comprised of monosaccharides, about 16% is comprised of di- and trisaccharides, about 6% is comprised of higher saccharides, and about 44% is comprised of sucrose. About 24% of the baked muffin is comprised of starch so that the saccharide to starch ratio of the muffin is about 1.56. About 17% of the baked muffin comprises fat. About 2.7% of the baked muffin comprises protein. This muffin has a moist, tender texture without being gummy or tacky. The muffin disperses quickly in the mouth upon eating. This product will retain these fresh baked characteristics at all stages of shelf life for up to a year or more. To assure that the $A_w$ of the muffin remains at this desirable level, the muffin is packaged in a moisture tight container.

Substantially similar results are obtained if the velvet bleached cake flour and wheat starch of this example are replaced with a one to one mixture of hard wheat flour and wheat starch. Substantially similar results are also obtained if part or all of the wheat flour of this example is replaced with a synthetic flour, triticale, bran, oat flour, oatmeal or cornmeal. Substantially similar results are also obtained if the Isosweet 100 ® and Neto 7350 ® corn syrups of this example are replaced with 148.26 grams of Amaizo ® DE 62 and 123.55 grams of dry fructose obtained from Süddentsche Zucker-Aktiengesellschaft Mannheim.

EXAMPLE V

Soft, moist chocolate cookies are prepared by taking the brownie batter of Example I and dropping from about 10 g to about 25 g of batter at spaced intervals on an oiled cookie sheet and baking at 375° F. for from 7 to 8½ minutes.

These cookies have a soft, chewy texture without being gummy or tacky. The cookies disperse quickly in the mouth upon eating. The water activity of the baked cookies is between 0.50 and 0.65, the total saccharide content and its breakdown into individual sugars is the same as for the brownies of Example I. The same is true for the starch content, the saccharide to starch ratio, the fat content, and the protein content. This product will retain these fresh baked characteristics at all stages of shelf life for up to a year or more. To assure that the $A_w$ of the cookie remains at this desirable level, the cookie is packaged in a moisture tight container.

EXAMPLE VI

A wet batter pre-mix for the brownie is prepared by taking the brownie batter of Example I and adding to it about 25 g of an emulsifier comprising propylene glycol monostearate and the lactic acid ester of monoglycerides of hydrogenated soybean oil in a 1:1 ratio (preferably the emulsifier is first dissolved in the oil or shortening to produce an emulsified shortening), and about 10 g of the preservative calcium propionate. The water activity of the wet batter composition is between 0.70 and 0.74. The total percentage of saccharides in the composition is about 37% (with the same breakdown for the individual sugars as Example I). The total starch content is about 18% so that the saccharide to starch ratio is about 2. The total fat content of the batter composition is about 17%. The protein content of the batter composition is about 2%. The wet batter pre-mix is baked as in Example I to form a brownie with the same unique characteristics as the brownie of Example I.

EXAMPLE VII

A chocolate brownie dry pre-mix is prepared by the following method:

| Ingredient | Amount (gms) |
| --- | --- |
| Dry Pre-Mix Mixture | |
| Sugar System Mixture* | 208.25 |
| Crisco ® Shortening (The Procter & Gamble Company) | 44.62 |
| Wheat starch (Ogilvie Mills) | 22.01 |
| Velvet bleached cake flour (International Multifoods) | 79.11 |
| Salt | 3.29 |
| Baking Soda | 0.07 |
| Cocoa | 35.23 |
| Vanilla Powder | 0.41 |
| Carrageenan | 0.41 |
| *Sugar System Mixture | |
| Sucrose (Colonial Sugar) | 102.23 |
| Dextrose (A. E. Staley Co.) | 39.17 |
| Maltose, monohydrate (Sigma Chemical Co.) | 19.91 |
| Crystalline fructose (Suddentsche Zucker-Aktiengesellschaft Mannheim) | 28.84 |
| Maltrin M205 ® Corn Syrup Solids (Grain Processing Corp.) | 18.10 |

The components of the sugar are first combined and mixed well. A Hobart Model C-100 mixer is operated at speed #1 to mix 166.64 grams of the sugar mixture with the shortening. The starch, flour, salt, baking soda, cocoa, vanilla, and carrageenan are then added and mixed. The remaining 41.61 grams of sugar mixture is then added and the mixer is operated until the mixture is thoroughly blended. The mixer bowl is scraped after each addition.

This dry mix has a water activity of between 0.2 and 0.4; and comprises about 53% of a saccharide mixture, comprising about 49% sucrose, about 33% monosaccharides, about 10% of a disaccharide, and about 8% higher saccharides; about 26% of a starch component; about 2% protein; and about 11% of a shortening component.

A brownie can be prepared from the dry mix by combining it with 44.62 grams of "Crisco" brand oil (commercially available from The Procter & Gamble Company), 48 grams of fresh whole egg, and 30 grams of water with a Hobart Model C-100 mixer at speed #1. The batter is placed in a 8"×8" oiled cake pan. The water activity of the batter is between 0.70 and 0.74. The pan is placed in a conventional General Electric deck oven and the batter is baked for 28-30 minutes at 350° F.

The water activity of the baked brownie is between 0.58 and 0.65. The total percentage of saccharides in the baked brownies is about 40%, comprising the same breakdown of saccharides as before baking. The starch component comprises 20% of the baked brownies, the shortening component comprises about 17% of the baked brownies and the brownies comprise about 1% protein.

These brownies have a moist chewy texture without being gummy or tacky which allows for fast mouth dispersion upon eating. This product will retain these fresh baked characteristics at all stages of shelf life for up to a year or more. To assure that the $A_w$ of the brownies remains at this desirable level, so that these fresh baked characteristics are maintained, the brownie is packaged in a moisture tight package.

Substantially similar results are obtained if the velvet bleached cake flour and wheat starch of this example are replaced with a one to one mixture of hard wheat flour and wheat starch. Substantially similar results are obtained if part, or all of the wheat flour of this example is replaced with synthetic wheat flour, triticale, oat flour or corn flour.

What is claimed is:

1. A crumb structured, ready-to eat baked batter-derived snack product with a water activity of from about 0.40 to about 0.75, said snack product having extended storage stability and resistance to staling, comprising:
   (a) from about 20 to about 60% of a saccharide mixture, which comprises, by weight of said saccharide mixture:
      (1) from about 25 to about 45% monosaccharides selected from the group consisting of glucose, fructose, and mixtures thereof;
      (2) from about 10 to about 50% glucose-based di- and trisaccharides selected from the group consisting of maltose, isomaltose, maltotriose and other isomers of glucose-based trisaccharides, and mixtures thereof;
      (3) from about 4 to about 9% glucose-based tetra- and higher saccharides; and
      (4) from about 15 to about 60% sucrose; and
   (b) from about 15 to about 35% of a starch component wherein the saccharide to starch ratio is from about 1:1 to about 4.5:1.

2. The snack product of claim 1 having a water activity of is from about 0.45 to about 0.70.

3. The snack product of claim 2 having a saccharide to starch ratio from about 1.4:1 to about 3.0:1.

4. The snack product of claim 3 wherein the sacchuride mixtuure comprises from about 35 to about 45% of said snack product.

5. The snack product of claim 2 wherein the monosaccharides comprise from about 30 to about 35% of the total saccharide mixture of said snack product.

6. The snack product of claim 5 wherein the glucose-based di- and trisaccharides comprise from about 10 to about 35% of the saccharide mixture.

7. The snack product of claim 6 wherein the glucose-based tetra- and higher saccharides comprise from about 6 to about 8% of the saccharide mixture.

8. The snack product of claim 7 wherein sucrose comprises from about 30 to about 55% of the saccharide mixture.

9. The snack product of claim 2 wherein the saccharide mixture is comprised of from about 30 to about 35% of a high fructose corn syrup, from about 20 to about 25% of a high maltose corn syrup, and from about 40 to about 50% of sucrose.

10. The snack product of claim 2 wherein the saccharide mixture is comprised of from about 25 to about 45% of a mixture of dry fructose and dry glucose, from about 10 to about 20% dry maltose, from about 4 to about 9% dry corn syrup solids of tetra- and higher saccharides, and from about 15 to about 60% dry sucrose.

11. The snack product of claim 2 which additionally comprises from about 10 to about 25% of a shortening component.

12. The snack product of claim 11 which additionally comprises from about 0.1 to about 6%, on a dry solids basis, of an egg component.

13. The snack product of claim 12 which additionally comprises from about 0.1 to about 2% of a leavening agent.

14. The snack product of claim 1 in the form of a brownie, having a water activity of from about 0.60 to about 0.65, said brownie having extended storage stability and resistance to staling, comprising:
   (a) from about 20 to about 60% of a saccharide mixture, which comprises, by weight of said saccharide mixture:
      (1) from about 25 to about 45% monosaccharides selected from the group consisting of glucose, fructose, and mixtures thereof;
      (2) from about 10 to about 50% glucose-based di- and trisaccharides selected from the group consisting of maltose, isomaltose, maltotriose and other isomers of glucose-based trisaccharides, and mixtures thereof;
      (3) from about 4 to about 9% glucose-based tetra- and higher saccharides; and
      (4) from about 15 to about 60% sucrose; and
   (b) from about 15 to about 35% of a starch component;
   (c) from about 10 to about 25% of a shortening component;
   (d) from 0.1 to about 6%, on a dry solids basis, of an egg component;
   (e) from 0.1 to about 2% of a leavening agent; and having a protein content of from about 0.1% to about 2.5%.

15. The snack product of claim 1 in the form of a snack cake, having a water activity of from about 0.60 to about 0.65, said snack cake having extended storage stability and resistance to staling, comprising:
   (a) from about 20 to about 60% of a saccharide mixture, which comprises, by weight of said saccharide mixture;
      (1) from about 25 to about 45% monosaccharides selected from the group consisting of glucose, fructose, and mixtures thereof;
      (2) from about 10 to about 50% glucose-based di- and trisaccharides selected from the group consisting of maltose, isomaltose, maltotriose and other isomers of glucose-based trisaccharides, and mixtures thereof;
      (3) from about 4 to about 9% glucose-based tetra- and higher saccharides; and
      (4) from about 15 to about 60% sucrose; and
   (b) from about 15 to about 35% of a starch component;
   (c) from about 10 to about 25% of a shortening component;
   (d) from 0.1 to about 6%, on a dry solids basis, of an egg component;
   (e) from 0.1 to about 2% of a leavening agent; and having a protein content of from about 0.5 to about 5%.

16. The snack product of claim 1 in the form of a muffin, having a water activity of from about 0.60 to about 0.65, said muffin having extended storage stability and resistance to staling, comprising:
(a) from about 20 to about 60% of a saccharide mixture, which comprises, by weight of said saccharide mixture:
(1) from about 25 to about 45% monosaccharides selected from the group consisting of glucose, fructose, and mixtures thereof;
(2) from about 10 to about 50% glucose-based di- and trisaccharides selected from the group consisting of maltose, isomaltose, maltotriose and other isomers of glucose-based trisaccharides, and mixtures thereof;
(3) from about 4 to about 9% glucose based tetra- and higher saccharides; and
(4) from about 15 to about 60% sucrose; and
(b) from about 15 to about 35% of a starch component;
(c) from about 10 to about 25% of a shortening component;
(d) from 0.1 to about 6%, on a dry solids basis, of an egg component;
(e) from 0.1 to about 2% of a leavening agent; and having a protein content of from about 0.5 to about 5%.

17. The snack product of claim 1 in the form of a cookie, having a water activity of from about 0.50 to about 0.65, said cookie having extended storage stability and resistance to staling, comprising:
(a) from about 20 to about 60% of a saccharide mixture, which comprises, by weight of said saccharide mixture:
(1) from about 25 to about 45% monosaccharides selected from the group consisting of glucose, fructose, and mixtures thereof;
(2) from about 10 to about 50% glucose-based di- and trisaccharides selected from the group consisting of maltose, isomaltose, maltotriose and other isomers of glucose-based trisaccharides, and mixtures thereof;
(3) from about 4 to about 9% glucose-base tetra- and higher saccharides; and
(4) from about 15 to about 60% sucrose; and
(b) from about 15 to about 35% of a starch component;
(c) from about 10 to about 25% of a shortening component;
(d) from 0.1 to about 6%, on a dry solids basis, of an egg component;
(e) from 0.1 to about 2% of a leavening agent; and having a protein content of from about 0.1 to about 2.5%.

18. The snack product of claim 2 which packaged in a moisture tight package.

19. A wet batter pre-mix composition, with a water activity of from about 0.65 to about 0.80 for use in preparing a crumb structured, ready-to-eat baked batter-derived snack product with a water activity of from about 0.40 to about 0.75, said snack product having extended storage stability and resistance to staling comprising:
(a) from about 20 to about 60% of a saccharide mixture, which comprises, by weight of said saccharide mixture:
(1) from about 25 to about 45% monosaccharides selected from the group consisting of glucose, fructose, and mixtures thereof;
(2) from about 10 to about 50% glucose-based di- and trisaccharides selected from the group consisting of maltose, isomaltose, maltotriose and other isomers of glucose-based trisaccharides, and mixtures thereof;
(3) from about 4 to about 9% glucose-based tetra- and higher saccharides;
(4) from about 15 to about 60% sucrose; and
(b) from about 15 to about 35% of a starch component the saccharide to starch ratio is from about 1.4:1 to 3.0:1.

20. The pre-mix composition of claim 19 wherein the saccharide mixture comprises from about 35 to about 45% of said composition, and the water activity of said composition is from about 0.70 to about 0.75.

21. The pre-mix composition of claim 20 wherein the monosaccharides comprise from about 30 to about 35% of the saccharide mixture, the glucose-based di- and trisaccharides comprise from about 10 to about 35% of the saccharide mixture, the glucose-based tetra- and higher saccharides comprise from about 6 to about 8% of the saccharide mixture, and the sucrose comprises from about 30 to about 55% of the saccharide mixture.

22. The pre-mix composition of claim 21 which additionally comprises from about 10 to about 25% of a shortening component, from about 0.1 to about 6%, on a dry solids basis, of an egg component, and from about 0.1 to about 2% of a leavening agent.

23. The pre-mix composition of claim 22 which additionally comprises from about 0.1 to about 10% of an emulsifier and from about 0.1 to about 2% of a preservative.

24. A dry pre-mix composition, with a water activity of from about 0.2 to about 0.4 for use in preparing a crumb structured, ready-to-eat baked batter-derived snack product with a water activity of from about 0.40 to about 0.75, said snack product having an extended storage stability and resistance to staling, comprising:
(a) from about 20 to about 60% of a saccharide mixture, which comprises, by weight of said saccharide mixture:
(1) from about 25 to about 45% monosaccharides selected from the group consisting of glucose, fructose, and mixtures thereof;
(2) from about 10 to about 50% glucose-based di- and tri-saccharides selected from the group consisting of maltose, isomaltose, maltotriose and other isomers of glucose-based trisaccharides, and mixtures thereof;
(3) from about 4 to about 9% glucose-based tetra- and higher saccharides; and
(4) from about 15 to about 60% dry granulated sucrose; and
(b) from about 15 to about 35% of a starch component the saccharide to starch ratio is from about 1.4:1 to 3.0:1.

25. The pre-mix composition of claim 24 wherein the saccharide mixture comprises from about 35 to about 45% of said composition, and the water activity of said composition is from about 0.2 to about 0.4.

26. The pre-mix composition of claim 25 wherein the monosaccharides comprise from about 30 to about 35% of the saccharide mixture, the glucose-based di- and trisaccharides comprise from about 10 to about 35% of the saccharide mixture, the glucose-based tetra- and higher saccharides comprise from about 6 to about 8% of the saccharide mixture, and the sucrose comprises from about 30 to about 55% of the saccharide mixture.

27. The pre-mix composition of claim 26 which additionally comprises from about 10 to about 25% of a shortening component, from about 0.1 to about 6%, on a dry solids basis, of an egg component, and from about 0.1 to about 2% of a leavening agent.

28. The pre-mix composition of claim 27 which additionally comprises from about 0.1 to about 10% of an emulsifier.

* * * * *